March 1, 1932. J. GRAY 1,847,430
TOOL FOR REMOVING AUTOMOBILE TIRES FROM THEIR RIMS
Filed March 12, 1931

Inventor:
John Gray

Patented Mar. 1, 1932

1,847,430

UNITED STATES PATENT OFFICE

JOHN GRAY, OF EDMONTON, ALBERTA, CANADA

TOOL FOR REMOVING AUTOMOBILE TIRES FROM THEIR RIMS

Application filed March 12, 1931, Serial No. 522,004, and in Canada February 4, 1931.

The invention relates to improvements in tools for removing automobile tires from their rims, and the objects are:

1. To provide a convenient tool for use in opening the rim locks used on the ordinary automobile tire rim.

2. By means of such tool to insure that the necessary force shall be applied evenly on both sides of the rim lock and not by way of side thrust or twisting applied to the rim, as is the case when the ordinary tool is used.

I attain these objects by a tool illustrated in the drawings, in which similar numbers refer to similar parts throughout the several views.

Figure 1 is a plan of the tool showing that it consists of a piece of metal forked at 2 and 3 with handle 1 and removable pin 4. The forked portions of the tool being rounded and hooked at ends 5 and 6.

Figure 1:
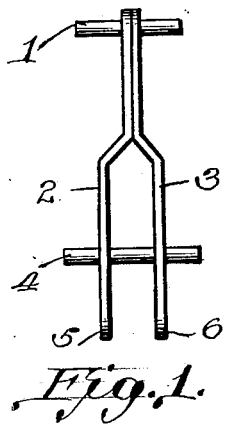
Figure 2:
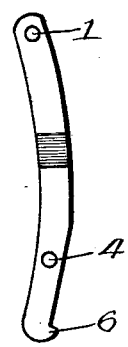
Figure 2 shows a side view of the tool showing hole for handle at 1, hole for removable pin at 4 and rounded and hooked end at 6.
Figure 3:
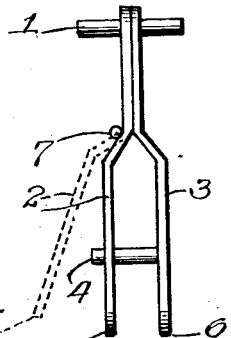
Figure 3 shows an alternative form of the tool showing one branch of the fork hinged at 7 so as to permit the use of pin 4 permanently attached to the other branch of the fork as shown.
Figure 4:
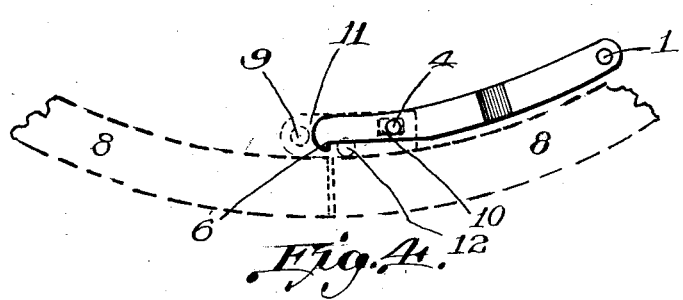

Figure 4 shows the tool placed on rim 8 ready to open rim. To open rim 8, pin 4 is removed from tool so as to permit tool to be placed down over rim lock far enough to permit pin 4 to be inserted through holes 4 and corresponding hole 10 in rim lock 11. Sufficient force is then applied at handle 1 to disengage rim lock. The hooked points 5 and 6 engage the point of rim 8 as this force is applied, thus preventing slipping of tool.

Figure 5:
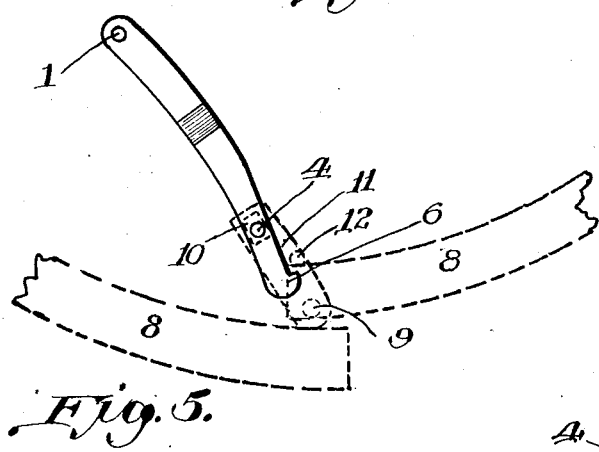

Figure 5 shows tool in position with rim open when operator is about to mount tire. In order to close rim tool is reversed with hooked points 5 and 6 resting on inside half of rim.

Figure 6:
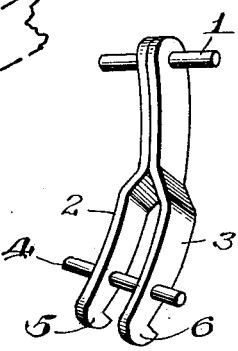

Fig. 6 is a perspective view of the tool.

I claim:—

1. A tool for locking and unlocking tire rim locks such as the Clev-weld rim lock and thereby expanding and contracting tire rims, consisting of a curved U shaped piece of metal with a handle projecting from the base of the U, each branch of the tool having a hooked end on its convex side adapted to engage the tire rim at the point where it is split, and being pierced a short distance from its end with a hole, and a removable pin adapted to be passed through the said holes in each branch of the tool and through the hole in the locking piece of the rim, for the purpose of fastening the tool to the locking piece, the tool being adapted to open the lock by lifting the handle of the tool and to contract the rim by further lifting the handle so that one end of the rim may be raised and passed over the other.

2. A tool for locking and unlocking tire rim locks such as the Clev-weld rim lock, consisting of a curved U shaped metal member, having a handle attached to the base of the U, having one branch of the U fixed and the other branch hinged near the base of the U, having a hole in the hinged branch of the U and a pin attached to the fixed branch of the U adapted to pass through the hole in the locking piece of the tire rim and then through the hole in the hinged branch of the U, for the purpose of fastening the tool to the locking piece, both branches having hooked ends on their convex sides adapted to engage the tire rim at the point where it is split, the tool being adapted to open the lock by lifting the handle of the tool and to contract the rim by further lifting the handle so that one end of the rim may be raised and passed over the other.

Edmonton, February 25th, 1931.

JOHN GRAY.